(12) United States Patent
Klatt et al.

(10) Patent No.: US 6,272,017 B1
(45) Date of Patent: Aug. 7, 2001

(54) ADAPTOR FOR CONNECTING A CHIP CARD TO A COMPUTER SLOT

(75) Inventors: Dieter Klatt, Wulfrath; Heinz Ungermann, Linsengericht; Bernhard Pelke, Wuppertal; Arnd Bäcker; Thomas Klenner, both of Hellenthal, all of (DE)

(73) Assignee: Stocko Metallwarenfabriken Henkels und Sohn GmbH & Co. (DE)

( * ) Notice: Subject to any disclaimer, the term of this patent is extended or adjusted under 35 U.S.C. 154(b) by 0 days.

(21) Appl. No.: 09/212,846

(22) Filed: Dec. 16, 1998

(30) Foreign Application Priority Data

Dec. 16, 1997 (DE) .............................................. 297 22 142

(51) Int. Cl.[7] ...................................................... H05K 1/14
(52) U.S. Cl. ............................................ 361/737; 439/945
(58) Field of Search ................................... 439/76.1, 638, 439/946, 945; 235/492; 361/737

(56) References Cited

U.S. PATENT DOCUMENTS

| | | |
|---|---|---|
| 5,397,857 | 3/1995 | Farguhar et al. . |
| 5,457,601 * | 10/1995 | Georgopulos et al. ............. 361/737 |
| 5,513,074 | 4/1996 | Ainsbury et al. . |
| 5,574,628 | 11/1996 | Persia et al. . |
| 5,674,080 * | 10/1997 | Takemura ............................. 439/260 |
| 5,748,443 | 5/1998 | Flint et al. . |
| 5,934,920 * | 8/1999 | Ito et al. .............................. 439/946 |
| 5,955,722 * | 9/1999 | Kurz et al. ........................... 235/492 |

FOREIGN PATENT DOCUMENTS

| | | |
|---|---|---|
| 9304034 | 4/1993 | (DE) . |
| 29505678 | 6/1995 | (DE) . |
| 19500636 | 1/1996 | (DE) . |
| 29601265 | 8/1996 | (DE) . |
| 29622184 | 4/1997 | (DE) . |

* cited by examiner

*Primary Examiner*—Neil Abrams
(74) *Attorney, Agent, or Firm*—Robert W. Becker & Associates

(57) ABSTRACT

An adaptor for connecting a chip card to a PCMCIA-standard computer slot has a housing with a top cover, a separate bottom cover, and at least one intermediate insulative element or frame connecting the top cover to the bottom cover at a spacing to one another. The top cover and bottom cover have substantially congruent outer contours. The housing has a receiving channel. A printed circuit board is mounted in the housing and extends parallel to the receiving channel. The circuit board has contact elements for electrically contacting a chip card received in the receiving channel. The housing has a front face and a back face wherein the front face has an insertion slot communicating with the receiving channel. The back face has a contact plug electrically connected to the printed circuit board and adapted to electrically contact the PCMCIA-standard computer slot. Cams at the channel entrance are used for card retention. The intermediate element is formed of plural parts which are joined by pins fitted into holes and which are molded about tabs that extend from the covers.

16 Claims, 4 Drawing Sheets

ADAPTOR FOR CONNECTING A CHIP CARD TO A COMPUTER SLOT

BACKGROUND OF THE INVENTION

The present invention relates to an adaptor for connecting chip cards to a computer slot, preferably according to PCMCIA standard, comprised of a card-shaped housing with an upper and lower cover plate having an insertion slot at one end face that opens into a receiving channel for receiving a chip card and also having at the opposite side a contact plug. A printed circuit board is enclosed in the housing and electrically connected to the contact plug. It extends parallel to the receiving channel and is provided with contact elements for contacting a chip card.

A chip card in the aforementioned context is defined as a card-shaped support element having electronic components, especially micro processors, in which different readable information data are saved. Such chip cards, also called smart cards, are especially employed in computer technology and have found more and more applications in connection with authentication of subjects. In addition to its use as an identity card, for example, for operating access control systems, chip cards are also increasingly used in connection with electronic banking where they are, for example, used by credit card companies in connection with POS systems in order to eliminate magnetic strip cards.

For reading a chip card, contacting units with reading device, in the form of an adaptor system, are provided that allow the connection of the chip card to a computer slot according to PCMCIA standard. The known adaptors of the prior art have a PCMCIA plug which can be used for mechanically and electrically contacting the respective PCMCIA slot of the computer system. The reading of the chip card is performed by contacting elements provided within the receiving channel for the chip card which contact the chip card physically or, for example, in a contact-free manner by optical or magnetic means.

From German Gebrauchsmuster 295 05 678 a contacting unit (adaptor) for card-shaped support elements with electronic components is known which is provided with a base plate having a size that is suitable for a plane-parallel receiving of a card-shaped support element. At least one printed circuit board with contacting elements at its surface is provided for contacting the electronic components of the support element, whereby the printed circuit board is especially parallel to the base plate. The support element also comprises a contact plug arranged at one of the end faces of the base plate. A plate shaped cover element, which is substantially congruent to the base plate, forms together with the printed circuit board a slot-shaped insertion channel. It is connected to the base plate in the area of the contact field and the opposed corners. The attachment in the area of the contact field is realized by two stays positioned laterally to the contact field which are unitary (monolithic) parts of the base plate and the cover element. A disadvantage is that such a construction can be produced only with great economical expenditure and is thus not suitable for inexpensive mass production. This is so because of the unitary construction of the base plate and the cover element which requires a time-consuming and thus unfavorable assembly. Furthermore, the selection of suitable materials is limited because the cover element for the stays must be bent about the contact field onto the underside of the contacting unit so that a certain bending flexibility of the material to be used is imperative.

It is therefore an object of the present invention to provide an adaptor for contacting chip cards with a standardized PCMCIA slot of a computer etc. such that a simple, inexpensive manufacture can be realized which allows economical mass production in view of the increasing use of the afore disclosed card systems.

SUMMARY OF THE INVENTION

This object is inventively solved for an adaptor of the aforementioned kind such that the top and bottom covers are two separate congruent components and that between the top and bottom covers at least one intermediate element is provided which connects the top and bottom covers to one anther.

An adaptor designed such can be produced simply and inexpensively and allows mass production in the aforementioned sense. This is possible because due to the two-part design with top and bottom covers a simple assembly results. By connecting the covers by intermediate elements, use of different materials, depending on the application, can be realized with minimal manufacturing-technological expenditure. Possible applications for the latter are, for example, to be seen in the use of non-conducting or conducting materials for the covers with respect to specifications concerning shielding, static compensation (dissipation) etc.

In a preferred embodiment, therefor the top cover is provided with a first intermediate element and the bottom cover is provided with second intermediate elements which have contacting surfaces for connecting the intermediate elements to one another. This has the advantage that the respective covers and corresponding intermediate elements can be premanufactured so that, after completion of assembly of the printed circuit board and the contact plug, a simple connection of the similar first and second intermediate elements at the top and bottom covers is possible. For this purpose, it is suggested that at the first and second intermediate elements matching pins and openings are arranged in order to achieve a simple and fast centering of the intermediate elements positioned atop one another which are then connected by ultrasound welding, adhesives or other material connections.

According to an alternative embodiment of the invention, the first and second intermediate elements are provided with corresponding pins and openings forming a detachable plug-in connection. In this manner a simple separation of the top and bottom covers via the intermediate elements is provided which ensures simple disassembly of an adaptor, for example, in connection with recycling.

According to a further advantageous feature, the first and second intermediate elements are injection-molded plastic parts which are connectable by injection molding to the respective top and bottom covers so that a simple and inexpensive manufacture of the intermediate elements as well as a reliable connection of the latter to the covers is possible. Expediently, the top and bottom covers are provided with tabs formed thereat which are then embedded by injection molding into the first and second intermediate elements in order to provide for a reliable material connection.

According to a further feature of the invention, the first intermediate element is a substantially U-shaped frame having an outer contour matching the contour of the top cover and having an inner contour with clamping and guiding portions for receiving the printed circuit board between the two legs of the frame. This has the advantage of increasing the torsional stiffness of the adaptor, for example, when the legs of the frame form parts of the lateral walls of the housing. By embodying the inner contour of the legs with clamping and guiding portions for receiving the printed circuit board, a higher functional integrity is also achieved. In order to ensure precise guiding and safe contacting of a chip card within the adaptor, which requires a substantially identical height of the chip card and the receiving channel, but also to ensure a simple and fast introduction of a chip card into the adaptor, according to a further advantageous embodiment of the invention the face of the base of the frame facing the receiving channel in the area of the insertion slot is provided at one side with a recessed portion. This ensures a slightly slanted and simple insertion of the chip card into the insertion slot of the adaptor.

It is especially advantageous that the second intermediate elements are in the form of spacer segments having substantially the same height as a chip card. The spacer elements, on the one hand, form the walls of the insertion slot at the front portion of the housing and, on the other hand, are arranged laterally relative to the contact plug while the lateral portions of the receiving channel communicating with the insertion slot are left open. In this manner a safe guiding and contacting of a chip card in the adaptor is ensured. At the same time the lateral open portions allows the realization of the card-shaped housing according to PCMCIA standard of the type I, II, III, or IV.

In order to increase the sturdiness and strength of the adaptor, according to a further advantageous embodiment of the invention the spacer segment arranged at the insertion slot is provided as a unitary part of the bottom plate that has an outer contour that matches the contour of the bottom cover. For the same purpose, it is also suggested that the bottom cover is provided with a depression in which a preferably metallic reinforcement plate is arranged. In preferred embodiment of the invention, the spacer segments are embodied as unitary or monolithic parts of the bottom plate which is congruent to the bottom cover. This has the advantage of simultaneous manufacture of the bottom cover and the reinforcing bottom plate so that an additional connection of the reinforcement plate is eliminated.

According to a further feature of the invention, the spacer segments arranged on opposite sides of the contact plug have at their facing inner surfaces clamping portions for securing the contact plug so that a simple and fast assembly is ensured. Expediently, the spacer segments within the area of the insertion slot have an inwardly oriented insertion slant for the chip card to be introduced and the spacer segments arranged on opposing sides of the contact plug have corner-positioned stops that limit the insertion depth of the chip card into the housing whereby the stops have a corner shape that matches the contour of the chip card. With these measures a simple introduction of the chip card and a safe seat within the receiving channel of the adaptor are ensured.

In order to provide an ergonomic handling of the adaptor, according to a further advantageous feature of the invention, it is suggested that the top cover at the end face adjacent to the insertion slot has a contour comprised of a plurality of part-circular recessed cutouts. The ergonomic handling is further improved by providing a projecting surface at the bottom cover relative to at least one of the two outer part-circular recessed cutouts of the top cover. At least one clamping cam is arranged on this projecting surface with which the chip card can be secured in the adaptor by cooperation with the stops provided at the second intermediate elements (spacer segments). This ensures that the contacting reliability is increased considerably.

Finally, it is suggested that the top and bottom covers are comprised of metal in order to provide for a robust and long-lived construction with excellent shielding.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 4.

Figure 1:
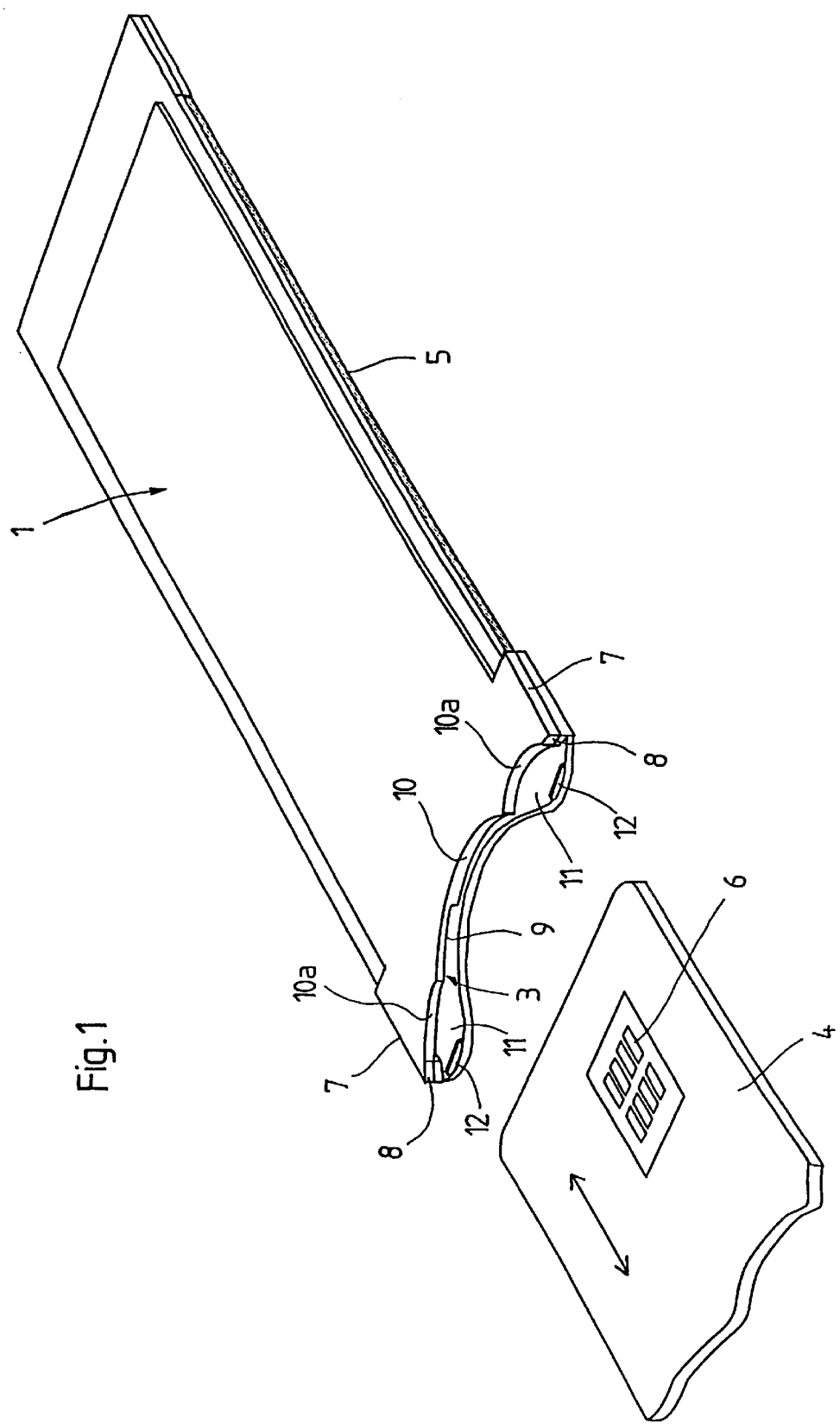
FIG. 1 is a perspective view of an adaptor and a chip card.
Figure 3:
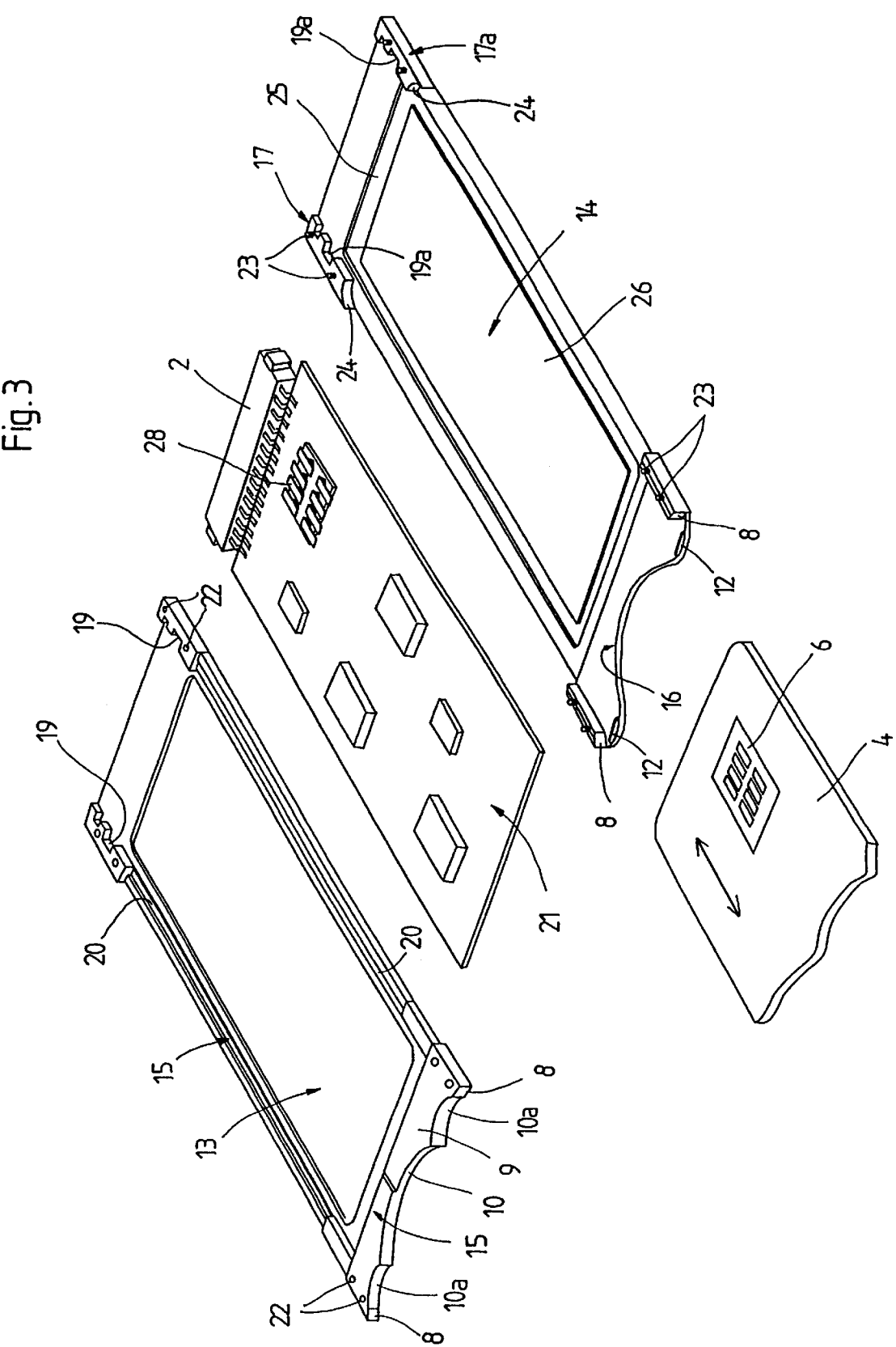
FIG. 3 is a perspective view of a printed circuit board provided with a contact plug as well as of the top and bottom covers provided with intermediate elements.
Figure 4:
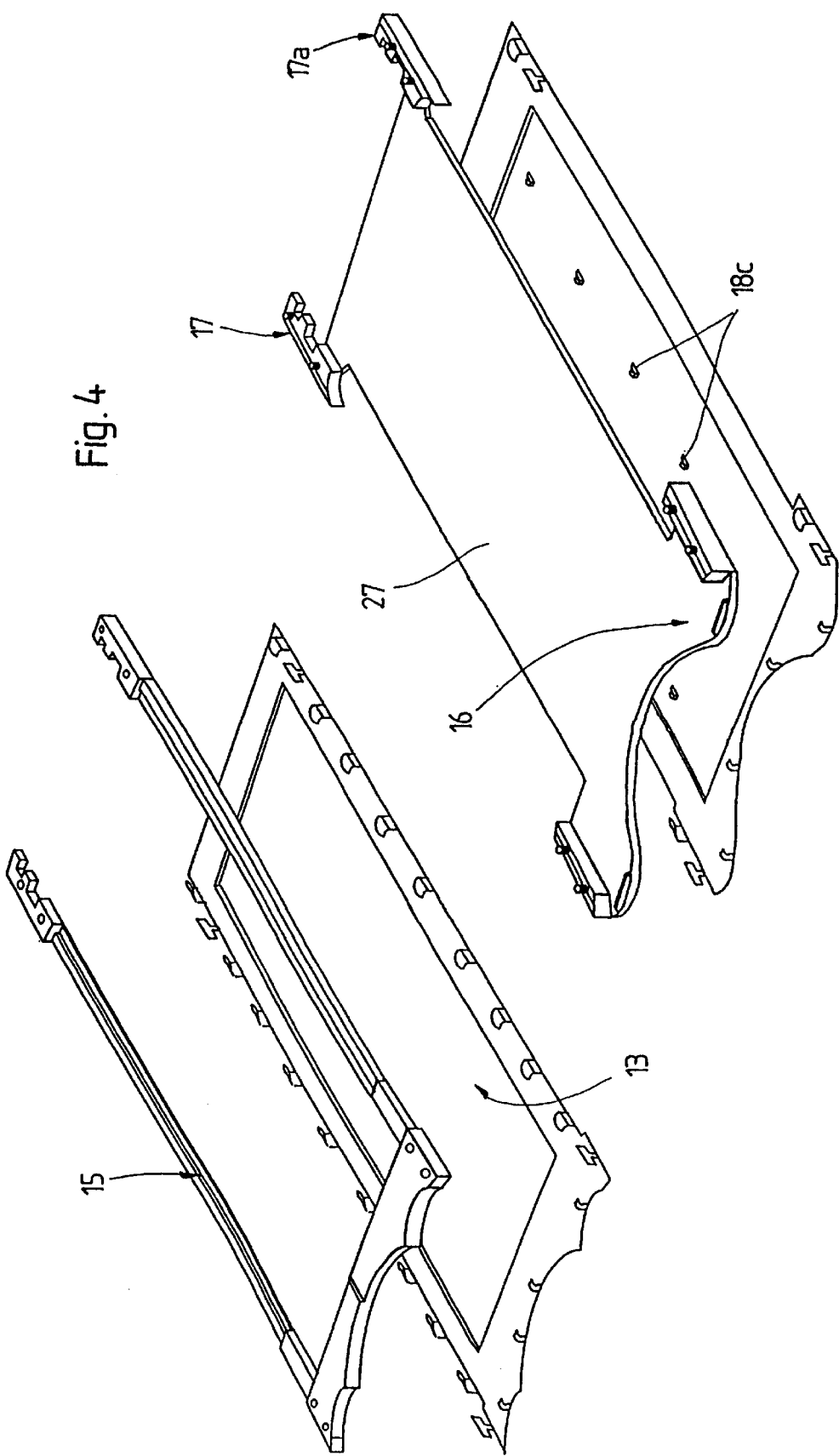
FIG. 4 shows an exploded view of the top and bottom covers with corresponding intermediate elements in an alternative embodiment.

The adaptor represented in FIG. 1 has a housing 1 having measurements that correspond to a PCMCIA card of the type II. The housing 1 is provided at one of its narrow ends (back end) with a PCMCIA contact plug which, as can be seen in FIG. 3, is arranged completely inside the housing 1. The housing 1 has at the opposite end (front end) an insertion slot 3 for a chip card 4 that communicates with a laterally open receiving channel 5. The chip card 4 is provided with a large surface area contact field (away) 6 and can be inserted into or removed from the housing 1 in the direction of the illustrated double arrow.

For improved insertion of the chip card 4, the lateral walls 7 in the area of the insertion slot 3 are provided with insertion slants 8 and the top surface of the insertion slot facing the receiving channel 5 has a recessed portion 9 allowing a slanted insertion of the chip card 4. Easy removal of an inserted chip card 4 is made possible by a plurality of recessed cutouts 10, 10a of a part-circular design at the front face of the housing 1 having the insertion slot 3 and by surfaces 11 projecting relative to the recessed portions 10a so that the user has easy access to the chip card 4. The projecting surfaces 11 are provided also as support surfaces for the chip card 4 during insertion so that insertion is made easy. In order to provide for locking of the inserted chip card 4, the surfaces 11 are provided with slightly projecting clamping cams 12 which secure the inserted chip card 4 in the receiving channel 5 and prevent accidental sliding out of the channel 5.

Figure 2:
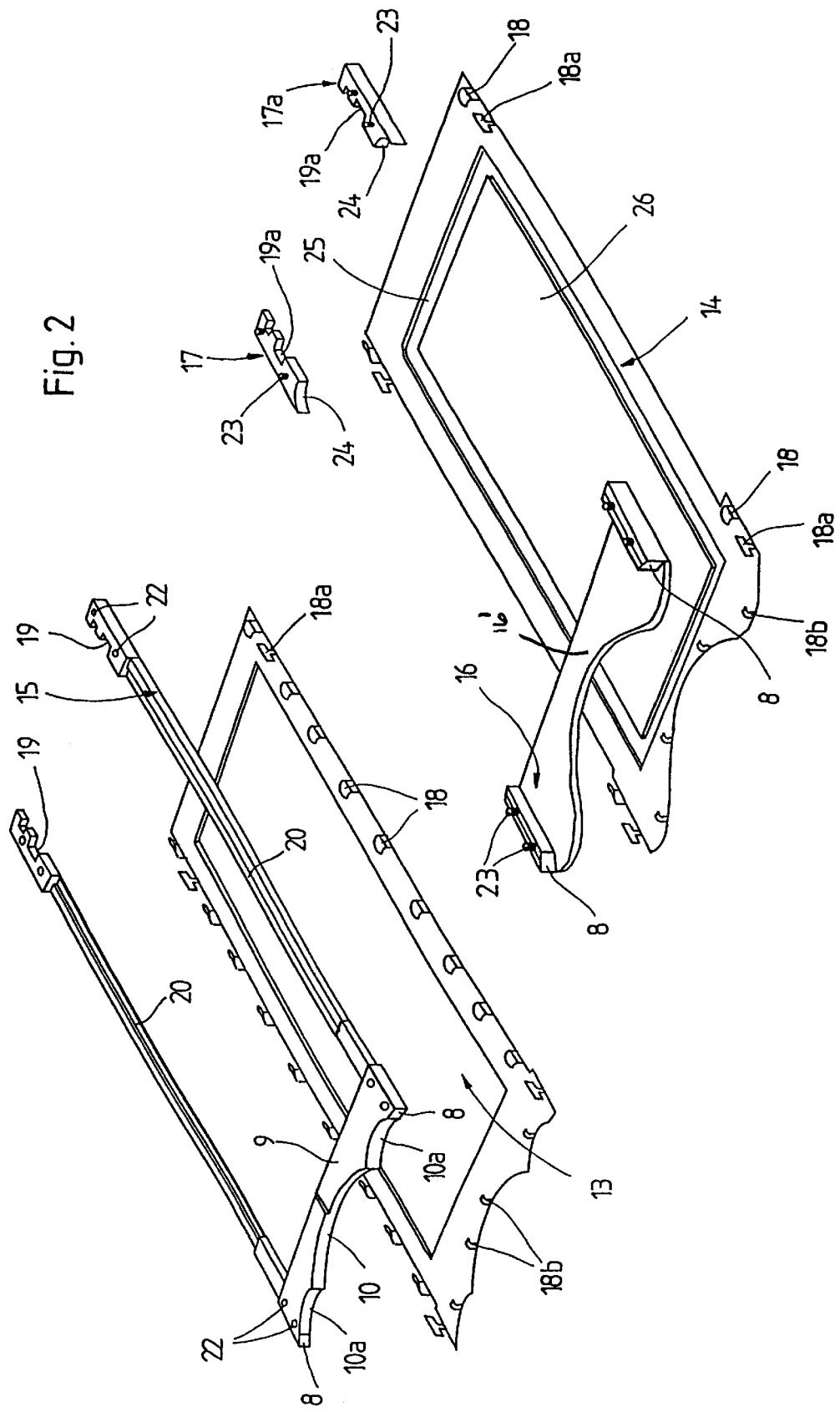
FIG. 2 is an exploded view of the top and bottom covers with corresponding intermediate elements.

As can be seen in FIG. 2, the housing 1 has a top cover 13 and a bottom cover 14 which are connected to one another by intermediate elements 15, 16, 17, 17a. The top and bottom covers 13, 14 are made as stamped sheet metal parts and have perpendicularly projecting tabs 18, 18a, 18b which during production of the intermediate elements 15 through 17a by plastic injection molding are embedded in the plastic material so that a simple but strong connection of the intermediate elements 15 through 17a and the top and bottom covers 13, 14 is ensured despite the use of different materials.

The intermediate element 15 arranged at the top cover 13 has a substantially U-shaped design with legs that have at its inner contour clamping and guiding portions 19, 20 for receiving the printed circuit board 21. The base of the intermediate element 15 is provided with the aforementioned insertion slant 8, the recessed portion 9, as well as the cutouts 10, 10a. The frame-like design of the intermediate element 15 ensures high torsional stiffness of the housing 1.

At the underside of the intermediate element 15 facing the receiving channel 5 openings 22 are provided in the lateral area of the base and in the end portion of the legs. The openings 22 are alined with matching pins 23 at the oppositely arranged intermediate elements 16–17a. Upon assembly of the adaptor, the pins 23 engage the openings 22. The intermediate elements 16–17a embodied as spacer segments have a height which corresponds substantially to the height of the chip card 4 and thus form the receiving channel 5. The intermediate element 16 (first space segment) arranged within the area of the insertion slot 3 has a bottom plate 16' having an end face that is shaped to match the contour of the bottom cover 14 and thus also forms the aforementioned projecting surfaces 11 on which the clamping cams 12 are provided. The clamping cams 12 may be a separate part or a unitary part of the surfaces 11 and may be made of metal or plastic. The intermediate elements 17, 17a in the area of the contact plug 2 have clamping portions 19a corresponding to the clamping portion 19. Together with the aforementioned clamping portions they receive the contact plug 2 that is electrically connected to the printed circuit board 21. The end faces of the intermediate elements 17,17a which face the leading edge of the chip card 4 are provided with stops 24 having a contour matching the corner shape of a chip card 4 and thus delimit the insertion depth of a chip card 4 into the housing 1 with respect to its leading corners.

As can be seen in FIG. 3, the bottom cover 14 has a depression 25 which receives a reinforcement plate 26. The attachment of the reinforcement plate 26, preferably comprised of metal, at the bottom cover increases the stiffness of the adaptor considerably and is carried out by ultrasound welding or by applying an adhesive. In the alternative embodiment shown in FIG. 4, the intermediate elements 16–17a are a unitary part of the bottom plate 27 which is connected by tabs 18c to the bottom cover 14. In this alternative embodiment the required torsional stiffness of the housing 1 is provided by the bottom plate 27 so that the reinforcement plate 26 as well as the required depression 25 in the bottom cover 14 is no longer required.

When assembling the adapter, the top and bottom covers 13, 14 provided with the intermediate elements 15–17a are positioned above one another such that the pins 23 engage the openings 22. At the same time, the circuit board 21 is positioned in the guide portions 20 and the contact plug 2 is received in the clamping portion 19, 19a. The intermediate elements 15–17a which are already centered by engagement of the pins 23 in the openings 22 can thus be connected by an adhesive or ultrasound welding. The design of the pins 23 and the matching openings 22 in the form of a plug-in connection can also be used for final attachment to another in addition to providing the beneficial centering action, whereby the detachable arrangement is favorable with respect to recycling.

The above disclosed adaptor is suitable for a PCMCIA slot of a computer (data processing unit) etc. whereby the receiving channel 5 is designed for a chip card 4 according to DIN ISO 7816 standard. The contact field (away) 6 arranged at the top side of the chip card 4 will be positioned when the card 4 inserted, at the contact elements 28 of the adaptor so that electrical contacting is ensured. Due to the suitable design of the adaptor for a chip card 4 according to DIN ISO 7816, in which the width of the card corresponds to the width of the housing according to PCMCIA standard, a lateral opening of the receiving channel 5 is necessary. The resulting disadvantage of reduced torsional stiffness and strength of the housing 1 is minimized by the design of the first intermediate element 15 as a substantially U-shaped frame as well as by providing a stiffening or reinforcement plate so that essentially no reduction in strength or stiffness is observed. By providing pins 23 and matching openings 22 a fast and easy manufacture is possible which is suitable for an economic mass production. When designing the adaptor with a detachable plug-in connection, the adaptor is also suitable for recycling.

The specification incorporates by reference the disclosure of German priority document DE 297 22 142.6 of Dec. 16, 1997.

The present invention is, of course, in no way restricted to the specific disclosure of the specification and drawings, but also encompasses any modifications within the scope of the appended claims.

What is claimed is:

1. An adaptor for connecting a chip card (4) to a PCMCIA-standard computer slot, said adaptor comprising:

a housing (1) having a top cover (13), a separate bottom cover (14), and at least one intermediate element (15, 16, 17) connecting said top cover (13) and said bottom cover (14) at a spacing to one another, wherein said top cover (13) and said bottom cover (14) have substantially congruent outer contours;

said housing (1) having a receiving channel (5);

a printed circuit board (21) mounted in said housing (1) and extending parallel to said receiving channel (5);

said printed circuit board (21) having contact elements (28) for electrically contacting a chip card received in said receiving slot (5);

said top cover (13) having a first one of said intermediate elements (15) and wherein said bottom cover (14) has a plurality of second ones of said intermediate elements (16, 17), wherein said first intermediate element (15) has a first contact surface and said second intermediate elements (16, 17) have second contact surfaces (16, 17) opposite said first contact surface, wherein said first and said second contact surfaces are connected to one another;

said first intermediate element (15) comprising a U-shaped frame having two legs between which said printed circuit board is received, wherein an outer contour of said U-shaped frame matches an outer contour of said top cover (13) and wherein an inner contour of said U-shaped frame has guide portions (19, 20) in which said printed circuit board (21) is received;

said housing (1) having a front end and a back end;

said front end having an insertion slot (3) communicating with said receiving channel (5);

said back end having a contact plug (2) electrically connected to said printed circuit board (21) and adapted to electrically contact the PCMCIA-standard computer slot.

2. An adaptor according to claim 1, wherein said first and second intermediate elements (15, 16, 17) have pins (23) and openings (22) matching said pins (23) for connecting said first and second contact surfaces to one another.

3. An adaptor according to claim 2, wherein said pins (23) and said openings (22) form a detachable plug connection for said first and second intermediate elements.

4. An adaptor according to claim 1, wherein said first and said second intermediate elements (15, 16, 17) are parts fastened to said top and bottom covers (13, 14) by injection molding.

5. An adaptor according to claim 4, wherein said top and bottom covers (13, 14) have tabs (18–18c) embedded by injection molding in said first and second intermediate elements (15–17a).

6. An adaptor according to claim 1, wherein said U-shaped frame has a base to which said legs are connected, wherein said base has a face facing said insertion slot (3), wherein said face of said base has a recessed portion (9) at one side thereof.

7. An adaptor according to claim 1, wherein said second intermediate elements (16, 17a) are spacer segments having a height almost matching a height of a chip card (4), wherein first ones (16) of said spacer segments form lateral walls 7 of said insertion slot (3) and wherein second ones (17) of said spacer segments are positioned on opposite sides of said contact plug (2), wherein lateral sides of said receiving channel (5) between said first and second spacer segments are open.

8. An adaptor according to claim 7, further comprising a bottom plate (27), wherein said first spacer segments (16) are provided as monolithic parts of said bottom plate (27), wherein said bottom plate (27) has an outer contour matching an outer contour of said bottom cover (14).

9. An adaptor according to claim 7, further comprising a reinforcement plate (26), wherein said bottom cover (14) has a depression (25) in which said reinforcement plate (26) is received.

10. An adaptor according to claim 9, wherein said reinforcement plate (26) is a metal plate.

11. An adaptor according to claim 7, further comprising a bottom plate (27), wherein said first and second spacer segments (16, 17) are provided as monolithic parts of said bottom plate (27), wherein said bottom plate (27) is congruent with said bottom cover (14).

12. An adaptor according to claim 7, wherein said second spacer segments (17) have inwardly directed sides facing one another and wherein said inwardly directed sides have clamping portions (19a) for securing said contact plug (2).

13. An adaptor according to claim 7, wherein said first spacer segments (16) have inwardly pointing slants (8) for guiding a chip card (4) into said receiving channel (5) and wherein said second spacer segments (17) have stops (24) for limiting an insertion depth of a chip card (4), wherein said stops have a contour matching corners of the chip card (4).

14. An adaptor according to claim 7, wherein said top cover (13) has an end face positioned at said front face of said housing, wherein said end face has a contour comprised of part-circular recessed cutouts (10, 10a).

15. An adaptor according to claim 14 wherein said bottom cover (14) has an end face positioned at said front face of said housing, wherein said end face of said bottom cover (14) has a projecting surface (11) at least within one of said part-circular recessed cutouts (10, 10a) laterally positioned at said insertion slot (3), wherein said projecting surface (11) has a clamping cam (12) for clamping a chip card (4) in said receiving channel (5) against stops (24) provided within said receiving channel (5) remote from said insertion slot (3).

16. An adaptor according to claim 1, wherein said top and bottom covers (13, 14) are made of metal.

\* \* \* \* \*